United States Patent
Bae et al.

(10) Patent No.: US 11,697,593 B2
(45) Date of Patent: Jul. 11, 2023

(54) METHOD FOR CONTINUOUSLY MASS-MANUFACTURING GRAPHENE USING HIGH-TEMPERATURE PLASMA EMISSION METHOD AND GRAPHENE MANUFACTURED BY MANUFACTURING METHOD

(71) Applicant: KB-ELEMENT Co., Ltd., Suwon-si (KR)

(72) Inventors: Kyoung Jeong Bae, Suwon-si (KR); Sul Hwa Choi, Seongnam-si (KR); Dinh Huong Nguyen, Suwon-si (KR)

(73) Assignee: KB-ELEMENT Co., Ltd., Suwon-si (KR)

( * ) Notice: Subject to any disclaimer, the term of this patent is extended or adjusted under 35 U.S.C. 154(b) by 27 days.

(21) Appl. No.: 17/394,356

(22) Filed: Aug. 4, 2021

(65) Prior Publication Data
US 2022/0153587 A1    May 19, 2022

(30) Foreign Application Priority Data

Nov. 19, 2020    (KR) .......................... 10-2020-0155961

(51) Int. Cl.
*C01B 32/19* (2017.01)

(52) U.S. Cl.
CPC .......... *C01B 32/19* (2017.08); *C01B 2204/22* (2013.01); *C01B 2204/30* (2013.01); *C01P 2002/82* (2013.01); *C01P 2004/03* (2013.01); *C01P 2004/04* (2013.01)

(58) Field of Classification Search
CPC . C01B 32/19; C01B 2204/22; C01B 2204/30; C01P 2004/03; C01P 2004/04
See application file for complete search history.

(56) References Cited

U.S. PATENT DOCUMENTS

2010/0147188 A1*  6/2010  Mamak ..................... C09C 1/46
                                                    977/773

FOREIGN PATENT DOCUMENTS

KR    10-2017-0101569 A    9/2017

OTHER PUBLICATIONS

Manning, Thomas J., et al. "Synthesis of exfoliated graphite from fluorinated graphite using an atmospheric-pressure argon plasma." Carbon 37.7 (1999): 1159-1164.*
Choi, Sung Yeun, et al. "Large scale production of high aspect ratio graphite nanoplatelets with tunable oxygen functionality." Journal of Materials Chemistry 21.13 (2011): 5142-5147.*
51311-17-2 (Graphite Fluoride) Product Description <https://www.chemicalbook.com/ChemicalProductProperty_US_CB1223264.aspx> Accessed Oct. 25, 2022.*

* cited by examiner

*Primary Examiner* — Richard M Rump
(74) *Attorney, Agent, or Firm* — Revolution IP, PLLC

(57) ABSTRACT

A method for continuously mass-manufacturing graphene using thermal plasma, the method for continuously mass-manufacturing graphene includes the steps of: (a) injecting an inert gas into a plasma device to generate plasma; (b) injecting expandable graphite and graphite intercalation compounds (GIC) into the plasma device in constant amounts; and (c) allowing the expandable graphite and GIC to be expanded by thermal plasma treatment so that graphene is exfoliated.

4 Claims, 5 Drawing Sheets

Graphene with a size of 5μm

Graphene with a thickness of 100nm or less

METHOD FOR CONTINUOUSLY MASS-MANUFACTURING GRAPHENE USING HIGH-TEMPERATURE PLASMA EMISSION METHOD AND GRAPHENE MANUFACTURED BY MANUFACTURING METHOD

TECHNICAL FIELD

The present disclosure relates to a method for continuously mass-manufacturing graphene using a high-temperature plasma emission method and graphene manufactured by the manufacturing method.

BACKGROUND

Graphene, as a two-dimensional allotrope made of carbon atoms, is a material having a honeycomb-shaped hexagonal structure, a very large specific surface area (about 2,600 $m^2/g$) compared to its volume, and theoretically very excellent capacitor properties of 550 Fg−1 and physical and chemical stability. Graphene has infinite possibility for applications such as energy storage materials, transparent electrode films, barrier films, graphene/metal composites, heat dissipation materials, etc.

A method for manufacturing such graphene is largely divided into a bottom-up method and a top-down method.

The bottom-up method, as a method mainly used when a starting material is not a carbon material, is a method for manufacturing graphene using gas such as methane ($CH_4$), ethane ($C_2H_6$), ethylene ($C_2H_4$), acetylene ($C_2H_2$), etc., SiC, a polymer, or the like, and includes a CVD method in which graphene is manufactured by injecting a mixed gas of methane and hydrogen at high temperatures using a metal that adsorbs carbon well such as Ni, Cu, and Pt as a catalyst layer, an epitaxial growth method in which carbon contained in SiC is separated into a surface at high temperatures, a plasma method in which a polymer such as PMMA or the like is deposited on a Cu foil, and then a microwave plasma is applied to the polymer deposited on the Cu foil to manufacture graphene, and other methods. In the case of using such a method, although it is easy to obtain large-area graphene, high-purity graphene may be obtained, and excellent electrical conductivity of graphene can also be realized, there are problems such as high price of graphene, a long time required for manufacturing graphene, and a difficulty in obtaining graphene in a powder form.

Meanwhile, the top-down method is a method for manufacturing graphene having a single layer or a water layer as a method in which the starting material is the carbon material, and which exfoliates the carbon material using external energy or a chemical method. Specifically, the top-down method includes a chemical exfoliation method which exfoliates graphene from graphite by inducing oxidation of the graphite surface using a strong acid, an electrochemical exfoliation method which exfoliates graphene from graphite by flowing electricity after immersing graphite in an electrolyte solution, a thermal expansion method in which graphite oxide is produced by oxidizing graphite using a strong acid, and then graphite oxide is expanded and exfoliated at high temperatures using a heat treatment furnace, and a microwave expansion method in which graphite oxide is produced using a strong acid, and then a microwave is applied to graphite oxide, thereby abruptly inducing the expansion of graphite oxide to exfoliate graphite oxide.

However, these methods facilitate mass production and enable graphene to be manufactured in a desired form such as a powder, a solution, or the like, but when an intermediate material is graphite oxide, there are problems in that physical properties can be realized only by performing the reduction process, and environmental problems, etc. may be caused by the use of acid.

Therefore, there is an urgent need for a graphene manufacturing method capable of continuously mass-producing graphene to solve these problems and obtain a high yield at a high speed while manufacturing high-purity graphene.

SUMMARY

The present disclosure is to solve the foregoing problems of the conventional art, and an object of the present disclosure is to provide a method capable of continuously mass-manufacturing high-purity graphene more efficiently without environmental problems.

The present disclosure provides a method for continuously manufacturing graphene from expandable graphite and graphite intercalation compounds by high-temperature thermal plasma treatment in order to solve the above-mentioned problems.

More specifically, the present disclosure provides a method for continuously mass-manufacturing graphene using thermal plasma, the method for continuously mass-manufacturing graphene comprising the steps of:

(a) injecting an inert gas into a plasma device to generate plasma;

(b) injecting expandable graphite and graphite intercalation compounds (GIC) into the plasma device in constant amounts; and (c) allowing the expandable graphite and GIC to be expanded by thermal plasma treatment so that graphene is exfoliated.

Furthermore, the present disclosure provides a method for continuously mass-manufacturing graphene, characterized in that the inert gas of the step (a) is one or more selected from the group consisting of argon and helium, and the inert gas is injected into the plasma device under the condition of a flow rate of 10 to 300 L/min.

Furthermore, the present disclosure provides a method for continuously mass-manufacturing graphene, characterized in that the expandable graphite of the step (b) has an average size of 0.1 to 2 mm, and the expandable graphite and GIC are injected in constant amounts in a speed range of 400 to 800 g/hr through a hopper.

Furthermore, the present disclosure provides a method for continuously mass-manufacturing graphene, characterized in that the thermal plasma treatment of the step (c) is performed using thermal plasma such as DC plasma or ultra-high frequency plasma having a temperature of 2,000 to 10,000° C.

Furthermore, the present disclosure provides a method for continuously mass-manufacturing graphene, characterized in that the thermal plasma treatment of the step (c) is performed for 0.01 to 5 seconds.

Furthermore, the present disclosure provides a method for continuously mass-manufacturing graphene, the method further comprising the steps of: (d) passing the exfoliated graphene through a vacuum chamber so that the exfoliated graphene is collected through a collector; and (e) cooling the collected graphene to obtain graphene in the form of a powder.

Furthermore, the present disclosure provides a method for continuously mass-manufacturing graphene, characterized in that the following Equation 1 is satisfied:

$$99 \le \frac{Y}{X} \times 100 \le 100 \qquad \text{[Equation 1]}$$

In Equation 1 above, X indicates the amount (g) of purified (pure) graphite contained in the expandable graphite injected in the step (b), and Y indicates the amount (g) of graphene obtained in the step (e).

Furthermore, the present disclosure provides graphene manufactured by the aforementioned method for continuously mass-manufacturing graphene.

A method for continuously mass-manufacturing graphene using a high-temperature plasma emission method according to the present disclosure does not require a reduction process by using expandable graphite and GIC as starting materials, and can manufacture environmentally friendly graphene which does not cause environmental problems since acid is not used.

Further, a method for continuously mass-manufacturing graphene using a high-temperature plasma emission method according to the present disclosure not only can obtain high-purity graphene when obtaining graphene by a plasma method, but also can collect manufactured graphene through a collector by applying a high-temperature thermal plasma so that it is possible to continuously mass-produce graphene with high yield at a high speed.

BRIEF DESCRIPTION OF THE DRAWINGS

The accompanying drawings are intended to explain the contents of the present disclosure in more detail to those skilled in the art, but the technical spirit of the present disclosure is not limited thereto.

DETAILED DESCRIPTION

Hereinafter, a method for continuously mass-manufacturing graphene using a high-temperature plasma emission method according to the present disclosure and graphene manufactured by the manufacturing method will be described in detail, but the scope of the method for continuously mass-manufacturing graphene using a high-temperature plasma emission method and graphene manufactured by the manufacturing method is not limited by the following description.

The present disclosure relates to a method for manufacturing graphene.

More specifically, the present disclosure relates to a method for continuously mass-manufacturing graphene using thermal plasma.

A method for continuously mass-manufacturing graphene using thermal plasma according to the present disclosure may comprise the steps of:

(a) injecting an inert gas into a plasma device to generate plasma;

(b) injecting expandable graphite and graphite intercalation compounds (GIC) into the plasma device in constant amounts; and (c) allowing the expandable graphite and GIC to be expanded by thermal plasma treatment so that graphene is exfoliated.

Figure 1:
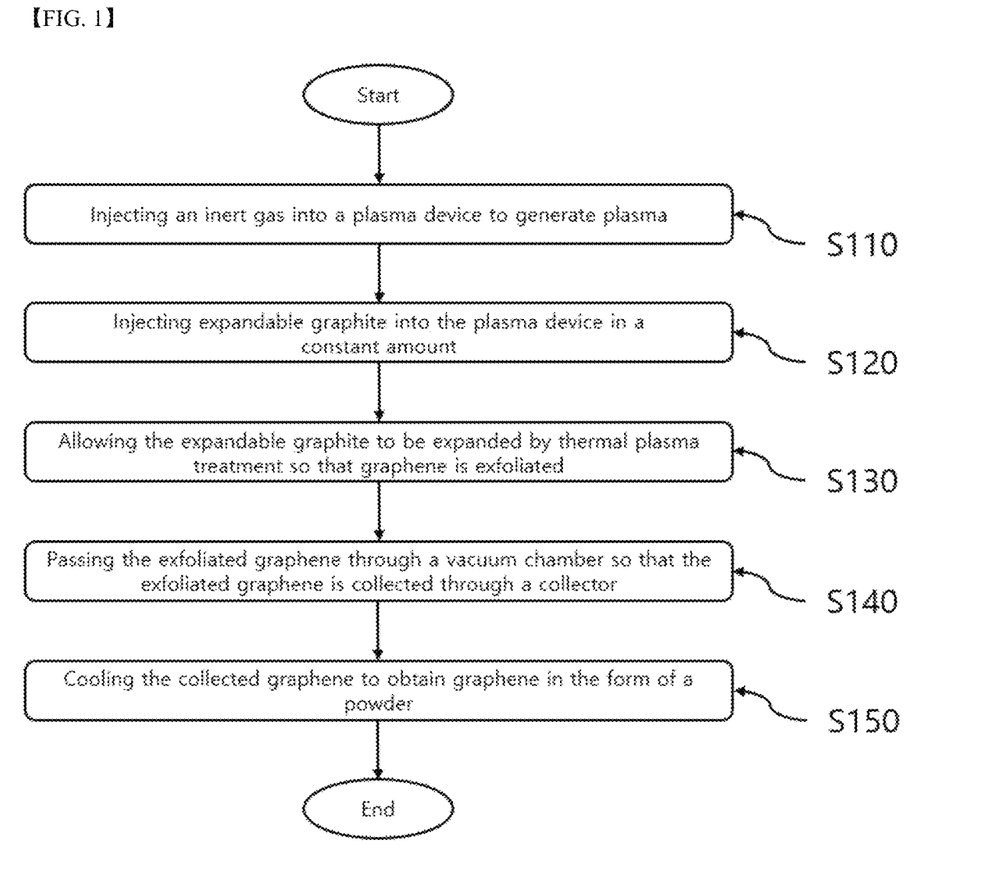
FIG. 1 is a flowchart for a method for continuously mass-manufacturing graphene according to an embodiment of the present disclosure.
Figure 2:
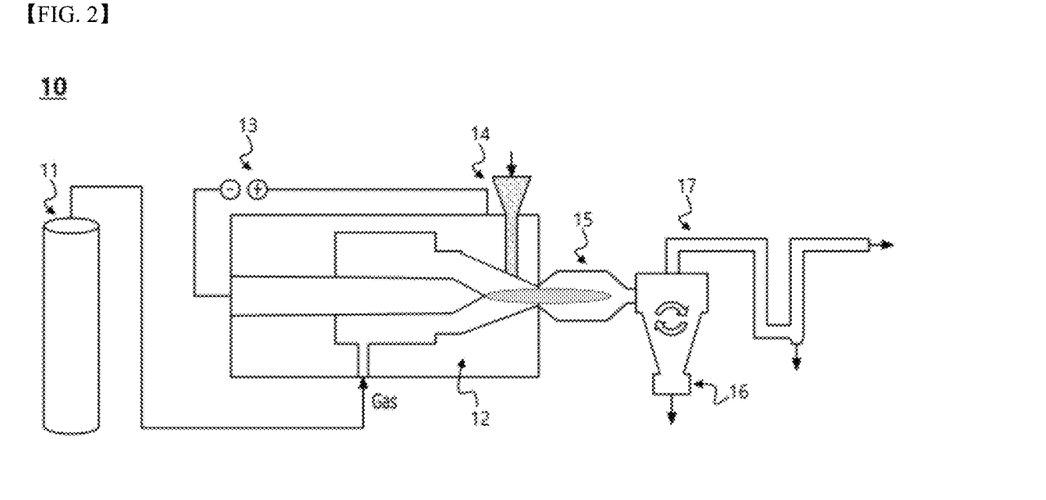
FIG. 2 is a schematic diagram of a manufacturing apparatus used in a method for continuously mass-manufacturing graphene according to an embodiment of the present disclosure.

FIG. 1 is a flowchart for a method for continuously mass-manufacturing graphene according to an embodiment of the present disclosure, and FIG. 2 is a schematic diagram of a manufacturing apparatus used in a method for continuously mass-manufacturing graphene according to an embodiment of the present disclosure.

Hereinafter, a method for continuously mass-manufacturing graphene according to an embodiment of the present disclosure will be described with reference to FIGS. 1 and 2.

Referring to FIG. 1, a method for continuously mass-manufacturing graphene according to the present disclosure comprises a step (a) of injecting an inert gas into a plasma device 12 to generate plasma (S100).

In this case, the inert gas of the step (a) may be injected into the plasma device 12 from a gas supply unit 11.

Although the inert gas is not particularly limited if it is a gas with a very low activity, the inert gas may be, for example, one selected from the group consisting of nitrogen, argon, helium, hydrogen and neon, or mixed gases thereof, preferably one selected from the group consisting of argon and helium, or a mixed gas thereof.

Further, when the inert gas is injected into the plasma device, it may be injected at a flow rate of 10 to 300 L/min, preferably 100 to 200 L/min.

When the inert gas supply flow rate is small, it is not preferable since the flow according to injection of the expandable graphite thereafter may not be smooth. This flow rate may be appropriately selected within the above range depending on the density of the expandable graphite, or other conditions.

When the inert gas is injected into the plasma device 12 and a current is supplied from a power supply device 13 to the plasma device 12, a high-temperature thermal plasma may be generated.

Meanwhile, a step (b) of injecting expandable graphite and graphite intercalation compounds (GIC) into the plasma device 12 in constant amounts (S120) is included simultaneously or next.

The term "expandable graphite" in the present specification may refer to a material in which graphite is chemically expanded by mixing a sulfur or nitrogen compound with graphite. In this case, it may refer to a material that can be further physically expanded by applying energy at this time as a form in which interlayer delamination of graphite is occurred by interlayer infiltration of the sulfur or nitrogen compound as the sulfur or nitrogen compound is used as an intercalating material infiltrating between the layers of graphite.

Since a detailed description of such expandable graphite is known in the art, the detailed description will be omitted.

The present inventors have recognized that it is difficult to obtain high-purity graphene continuously and in large quantities since environmental problems are generated as the oxidation is mainly performed using a strong acid although oxidation of the surface of graphite should be induced in the case of exfoliating graphene using a graphite material, and since an additional process is required as physical properties can be realized only when graphene is manufactured and then should be reduced again in the case of using the oxidized graphite.

Accordingly, the present inventors have completed the present disclosure by confirming that high-purity graphene capable of being commercially used may be obtained immediately and continuously since there is no environmental problem and a reduction process is not additionally required as a strong acid is not used when using expandable graphite as described in the contents of the present disclosure.

Therefore, it is necessary to use the expandable graphite as a starting material in a method for continuously mass-manufacturing graphene according to the present disclosure.

However, considering that the volume of the expandable graphite is increased 200 times or more when the expandable graphite is exfoliated into graphene in the case of using such expandable graphite, in the case of expanding and exfoliating the expandable graphite using high temperature box-type furnace or tunnel-type furnace in order to exfoliate the expandable graphite into graphene, there has been problems that only several grams of graphene per hour can be obtained even if the volume of the furnace is large, and it is difficult to mass-produce graphene commercially rapidly as continuous production is impossible since it is necessary to collect the powder separately after the reaction.

Accordingly, the present inventors have solved the above-mentioned problems by using a thermal plasma device 12 in order to continuously obtain high-purity graphene without the need for a separate additional process when obtaining graphene from the expandable graphite.

Meanwhile, the expandable graphite used in the manufacturing method according to the present disclosure may have an average size of 0.1 to 2 mm, preferably 0.5 to 2 mm, more preferably 1 to 2 mm.

Here, the average size means an average diameter (D50), and the average diameter may be measured using a laser diffraction method. Specifically, after dispersing expandable graphite, which is a powder to be measured, in a dispersion medium, the particle size distribution is calculated by measuring the diffraction pattern difference depending on the particle size when the particles pass through the laser beam by introducing the expandable graphite dispersed in the dispersion medium into a commercially available laser diffraction particle size measuring device (for example, Microtrac S3500). The average diameter can be measured by calculating the particle diameter at the point which becomes 50% of the particle number cumulative distribution depending on the particle diameter in the measuring device.

Since there is a problem that graphene with a sufficient size cannot be obtained when the expandable graphite has a too small average size of less than 0.1 mm, and there is a problem that graphene exfoliation by thermal plasma performed for a short time is not easily performed when the expandable graphite has a too large average size of more than 2 mm, the average size range of the expandable graphite is not preferable.

Meanwhile, in order to continuously manufacture graphene efficiently from the expandable graphite, the expandable graphite may be injected in a constant amount in a speed range of 400 to 800 g/hr through a hopper 14.

When the expandable graphite is not injected in a constant amount, graphene exfoliation by thermal plasma may not be efficiently performed. Further, since there is a problem of inefficiency due to the low graphene manufacturing speed when the expandable graphite is injected in a too small injection amount of less than 400 g/hr outside the above range, and there is a problem that the graphene exfoliation by thermal plasma may not be efficiently performed when the expandable graphite is injected in a too large injection amount of more than 800 g/hr, constantly injecting the expandable graphite within the injection amount range is important in continuously obtaining high-purity graphene.

A method for continuously mass-manufacturing graphene according to the present disclosure comprises a step (c) of allowing the expandable graphite and GIC to be expanded by thermal plasma treatment so that graphene is exfoliated (S130).

As described above, in a method for continuously mass-manufacturing graphene according to the present disclosure, when an inert gas, expandable graphite, and GIC are supplied to a plasma device 12, a step of (c) allowing the expandable graphite to be expanded by thermal plasma treatment so that graphene is exfoliated is performed.

The thermal plasma is generated inside the plasma device 12 by applying a voltage together with the supply of the inert gas.

At this time, the plasma device 12 may be a plasma torch nozzle.

Further, the thermal plasma of the step (c) may have a temperature of 2,000 to 10,000° C.

The expandable graphite can be rapidly expanded by plasma at a high temperature as above, and single-layered or multi-layered graphene can be exfoliated in an even form by such expansion.

Further, such thermal plasma treatment may be performed for 0.01 to 5 seconds, preferably 2 to 5 seconds.

Sufficient expansion may not be achieved if the thermal plasma treatment is performed for a too short time outside the above range, and there is a problem of inefficiency if the thermal plasma treatment is performed for a too long time.

Further, the generation of the thermal plasma is occurred by the flow of electric current by the power supply device 13. Accordingly, DC plasma, ultra-high frequency plasma, or RF plasma may be used, and specifically, DC plasma or ultra-high frequency plasma may be used. A faster reaction is possible when the DC plasma is used.

Moreover, the plasma output may be selected in a range of 10 to 200 kW, preferably 100 to 200 kW, and more preferably 120 to 150 kW.

The plasma output range is not preferable since graphene exfoliation may not be performed effectively and the number of graphene layers may become too many if the output is too low outside the above range, and graphene exfoliation is inefficient if the output is too high.

Furthermore, the plasma device 12 in which such thermal plasma treatment is performed may have an internal pressure of 0.2 to 1 bar, specifically 0.5 to 1 bar.

Moreover, although it is not specifically shown in the drawing, a cooling gas, for example, a gas such as argon, helium, nitrogen, or the like, for protecting the inside of the device 12 and primary cooling of the exfoliated graphene may be injected into the middle of the plasma device 12, and at this time, the supply flow rate of the cooling gas may be 10 to 500 L/min.

After this, when the process of exfoliating graphene from the expandable graphite and GIC by thermal plasma is completed, a method for continuously mass-manufacturing graphene according to the present disclosure may comprise a step (d) of collecting the exfoliated graphene through a collector 16 by passing the exfoliated graphene through a vacuum chamber 15 (S140).

The flow of the expandable graphite, graphene, inert gas, etc. may be induced in the collector direction by the vacuum chamber 15.

That is, the exfoliated graphene flows in the direction of the collector 16 by the vacuum chamber 15, and from this, graphene is fallen and collected while it is being rotated inside the collector by the principle of a cyclone, which is the collector, and other by-products and inert gases may be separated and discharged through a transfer pipe 17.

From this, the graphene may be continuously collected in the collector, and it is possible to mass-produce graphene continuously without a separate separation process.

Further, in addition to the above method, (e) the collected graphene may be cooled and obtained in the form of a powder (S150).

Further, graphene obtained by the method like this may have an average thickness of 100 nm or less, an average size of 0.5 to 5 μm, and an oxygen to carbon ratio (O/C ratio) of 0.2 or less.

More specifically, the graphene may have an average thickness of 20 to 80 nm, an average size of 1 to 5 μm, and an O/C ratio of 0.1 or less.

Here, the average thickness and average size of the graphene may be measured from transmission electron microscope (TEM) photographs of the graphene.

Specifically, when measuring the average thickness and average size of the graphene, the average thickness is a value obtained by arbitrarily selecting 10 graphenes from the TEM photographs, measuring the number of layers of the graphenes, and averaging the measured number of layers of the graphenes, and the average size is a value obtained by measuring diameters of the graphenes and averaging the measured diameters of the graphenes.

That is, graphene continuously manufactured from expandable graphite according to the present disclosure may be obtained in high purity with very little impurities without the need for a reduction process, and graphene obtained may also have excellent physical properties.

Therefore, there is provided graphene obtained by the graphene manufacturing method according to an embodiment of the present disclosure.

Further, a method for continuously mass-manufacturing graphene according to the present disclosure may satisfy the following Equation 1:

$$99 \leq \frac{Y}{X} \times 100 \leq 100 \qquad [\text{Equation 1}]$$

In Equation 1 above, X indicates the amount (g) of purified (pure) graphite contained in the expandable graphite injected in the step (b), and Y indicates the amount (g) of graphene obtained in the step (e).

In particular, since a method for continuously mass-manufacturing graphene according to the present disclosure can satisfy Equation 1 above, the yield of graphene (flakes) obtained compared to the expandable graphite injected is 99% or more, which obtains an advantage of enabling mass manufacturing of graphene.

With respect to the yield, since detailed description has been made in the following example, it is omitted.

Hereinafter, a method for continuously mass-manufacturing graphene according to an embodiment of the present disclosure will be described through a specific experimental example of the present disclosure.

Figure 3:
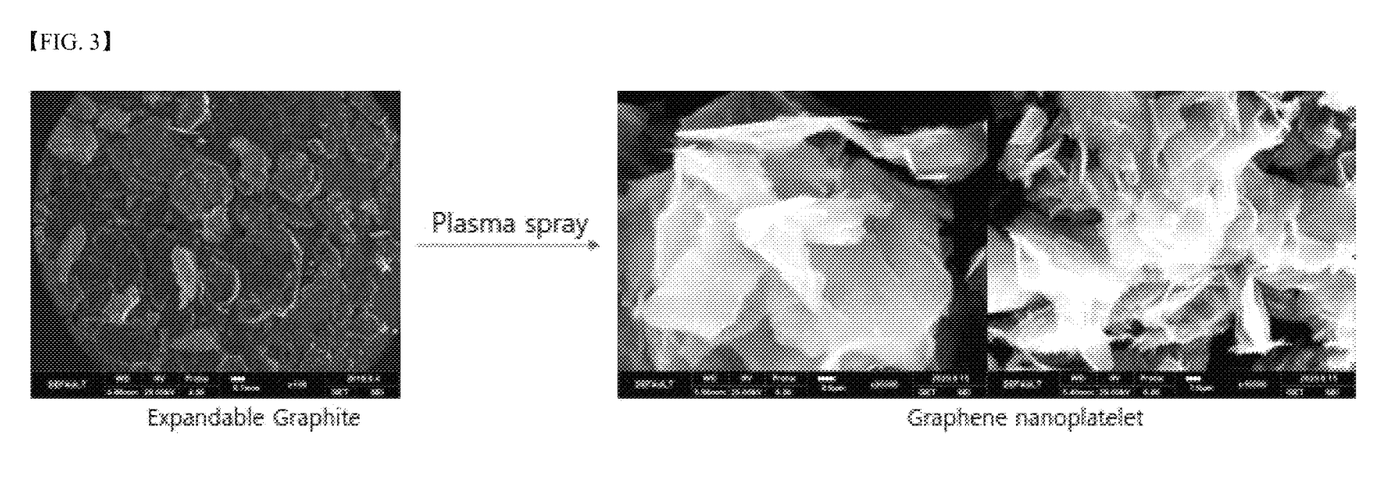
FIG. 3 is scanning electron microscope (SEM) photographs comparing expandable graphite used in a method for continuously mass-manufacturing graphene according to an embodiment of the present disclosure and graphene obtained therefrom by the manufacturing method according to an embodiment of the present disclosure.

First, FIG. 3 shows SEM photographs comparing expandable graphite used in a method for continuously mass-manufacturing graphene according to an embodiment of the present disclosure and graphene obtained therefrom by the manufacturing method according to an embodiment of the present disclosure.

Referring to FIG. 3, it can be confirmed that graphene is obtained in a state that the interlayer distance is rapidly increased by rapidly expanding expandable graphite by thermal plasma treatment. At this time, the expandable graphite is expanded 200 times or more.

Figure 4:
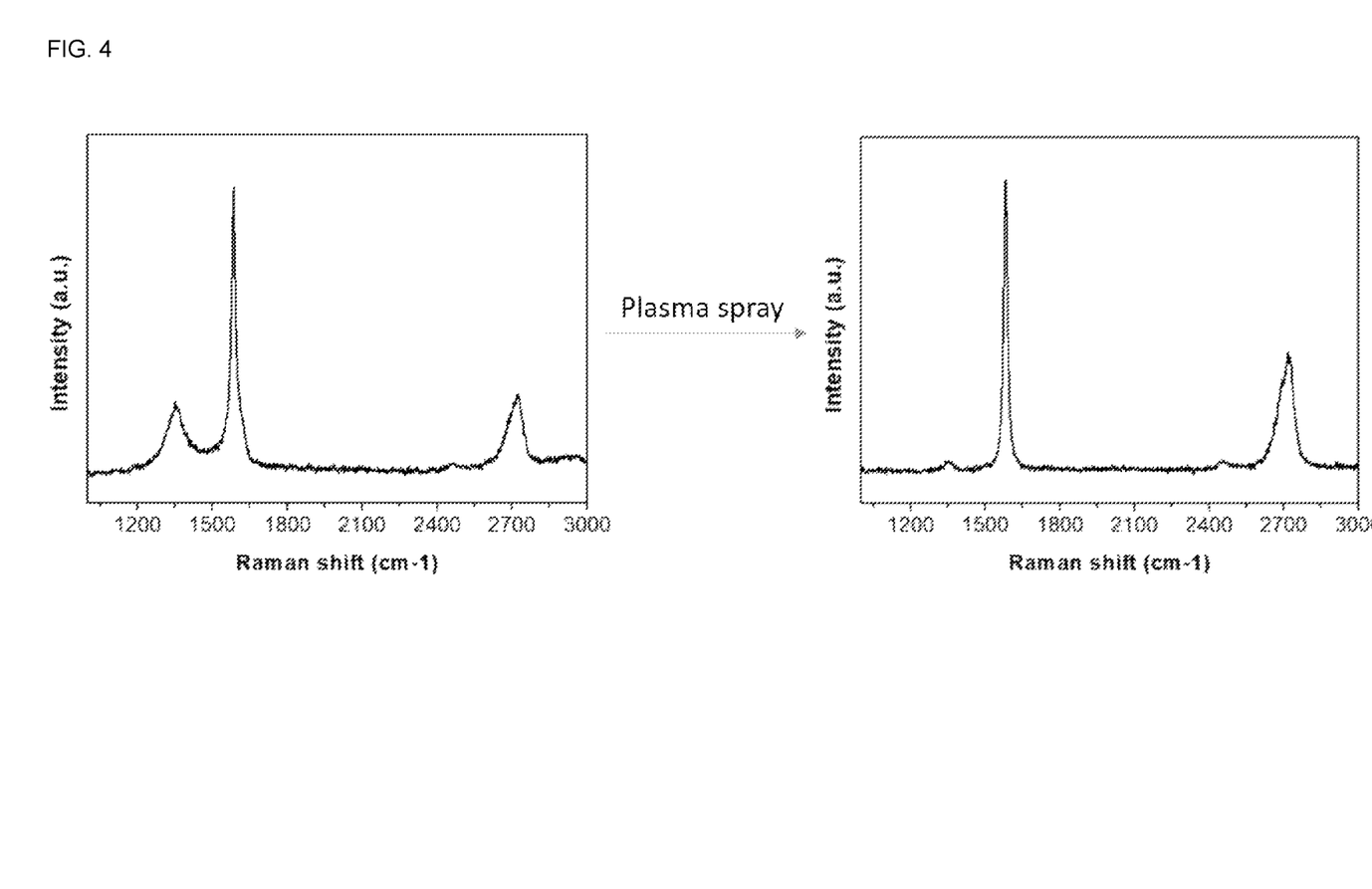
FIG. 4 is Raman spectrums comparing the expandable graphite and graphene of FIG. 3.

FIG. 4 also shows Raman spectrums comparing the expandable graphite and graphene.

The Raman spectrums were analyzed with respect to a range of 1,100 to 3,000 $cm^{-1}$ with a micro Raman spectrometer using a laser of 532 nm and a 50× lens.

Referring to FIG. 4, the obtained graphene shows a strong G peak in the vicinity of 1,580 $cm^{-1}$, a 2D peak in the vicinity of 2,720 $cm^{-1}$, and a D peak in the vicinity of 1,350 $cm^{-1}$. It can be confirmed that the D peak in the vicinity of 1,350 $cm^{-1}$ is significantly decreased in the graphene compared with the expandable graphite.

These Raman spectrums are an analysis method for checking purities of graphene and, conversely, defect degrees of graphene. The defect degrees may be compared by calculating the ID/IG ratio, which is a ratio of the intensity of the D peak in the vicinity of 1,350 $cm^{-1}$ to the intensity of the strong G peak in the vicinity of 1,580 $cm^{-1}$.

At this time, referring to FIG. 4 above, it can be confirmed that the graphene is obtained in high purity since the D peak in the vicinity of 1,350 $cm^{-1}$ of the obtained graphene is significantly decreased to an ID/IG ratio value of about 0.07 so that there are almost no defects.

Figure 5:
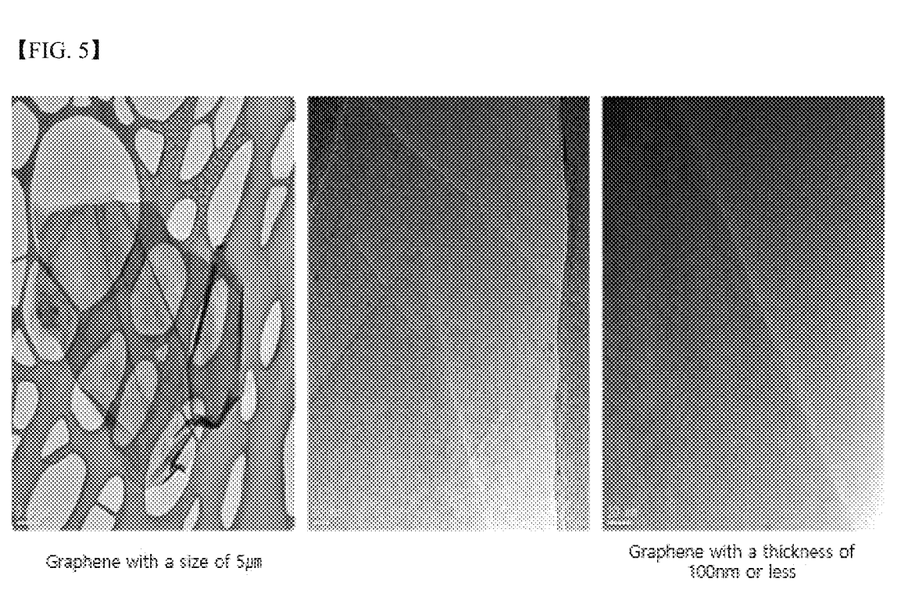
FIG. 5 is transmission electron microscope (TEM) photographs of the graphene of FIG. 3.

Further, FIG. 5 is TEM photographs of the graphene obtained according to the present disclosure.

According to the present disclosure, it can be confirmed that, when exfoliating graphene by applying thermal plasma using expandable graphite and GIC, graphene with excellent physical properties having a size of about 5 μm and a thickness of about 100 nm or less is obtained in a single layer or a multi-layer of several tens of layers or less.

EXAMPLE

After preparing expandable graphite with a purity of 95% (Hyundai Coma, EXP-820, an average size of 0.2 mm), a total 2,160 g of the prepared expandable graphite was injected into a thermal plasma device (applicant's self-production) at a speed of 12 g/min (720 g/h) for 3 hours, and the weight of graphene obtained was measured.

Specifically, the gas used in the device was a mixed gas having a 1:1 volume ratio of argon and helium, and was supplied to the device under the condition of a flow rate of 180 L/min.

The thermal plasma was DC plasma, and the output was set to 40 kW to generate plasma. At this time, the internal pressure of the device was set to 0.8 bar, and the thermal plasma treatment was performed for 2 seconds.

Further, nitrogen gas of 25° C. was injected into the middle of the device as a cooling gas.

The weight of the graphene obtained in Example above was 2,041 g.

Considering that the purity of the expandable graphite is 95%, since the amount of pure graphite present in the expandable graphite is 2,052 g, it may mean that 2,041 g of the obtained graphene exhibits a yield of 99.46%.

As can be confirmed in Example above, it can be seen that, when manufacturing graphene by the manufacturing method according to the present disclosure, graphene with high purity can be obtained within a short time.

The aforementioned description of the present application is for illustration purposes, and those with ordinary skill in the art to which the present application pertains will be able to understand that the present application can be easily modified into other specific forms without changing the technical spirit or essential features of the present application. Accordingly, the embodiments described above are exemplary in all aspects and should be understood not to be limited. For example, each constituent element described as a single form may also be dispersed and implemented, and similarly, constituent elements described as dispersed may also be implemented in a combined form.

The scope of the present application is indicated by patent claims described later rather than the above detailed description, and all changes or modified forms derived from meanings and scope of the patent claims, and equivalent concepts thereof should be construed to be included in the scope of the present application.

EXPLANATION OF MARKS

S110: Step of injecting an inert gas into a plasma device to generate plasma
S120: Step of injecting expandable graphite and graphite intercalation compounds (GIC) into the plasma device in constant amounts
S130: Step of allowing the expandable graphite and GIC to be expanded by thermal plasma treatment so that graphene is exfoliated
S140: Step of collecting the exfoliated graphene through a collector by passing the exfoliated graphene through a vacuum chamber
S150: Step of cooling the collected graphene to obtain the graphene in the form of a powder
10: Graphene manufacturing apparatus
11: Gas supply unit
12: Plasma device
13: Power supply device
14: Hopper
15: Vacuum chamber
16: Collector
17: Transfer pipe

What is claimed is:

1. A method for continuously mass-manufacturing graphene using thermal plasma, the method for continuously mass-manufacturing graphene comprising the steps of:
   (a) injecting an inert gas into a plasma device to generate plasma;
   (b) injecting expandable graphite and graphite intercalation compounds (GIC) into the plasma device in constant amounts;
   (c) allowing the expandable graphite and GIC to be expanded by thermal plasma treatment so that graphene is exfoliated;
   (d) passing the exfoliated graphene through a vacuum chamber so that the exfoliated graphene is collected through a collector; and
   (e) cooling the collected graphene to obtain graphene in the form of a powder,
   wherein the expandable graphite of the step (b) has an average size of 0.1 to 2 mm, and the expandable graphite and GIC are injected in constant amounts in a speed range of 400 to 800 g/hr through a hopper,
   wherein the following Equation 1 is satisfied:

$$99 \le \frac{Y}{X} \times 100 \le 100,$$ [Equation 1]

wherein X indicates the amount (g) of purified graphite contained in the expandable graphite injected in the step (b), and Y indicates the amount (g) of graphene obtained in the step (e).

2. The method of claim 1, wherein the inert gas of the step (a) is one or more selected from the group consisting of argon and helium, and the inert gas is injected into the plasma device under the condition of a flow rate of 10 to 300 L/min.

3. The method of claim 1, wherein the thermal plasma treatment of the step (c) is performed using thermal plasma selected from the group consisting of DC plasma or ultra-high frequency plasma having a temperature of 2,000 to 10,000° C.

4. The method of claim 1, wherein the thermal plasma treatment of the step (c) is performed for 0.01 to 5 seconds.

* * * * *